Jan. 21, 1958   J. SAPÉ ROCH   2,820,680
FOOTSTEP BEARING FOR VERTICAL REVOLVING
SHAFTS OF HIGH SPEED
Filed Nov. 16, 1954
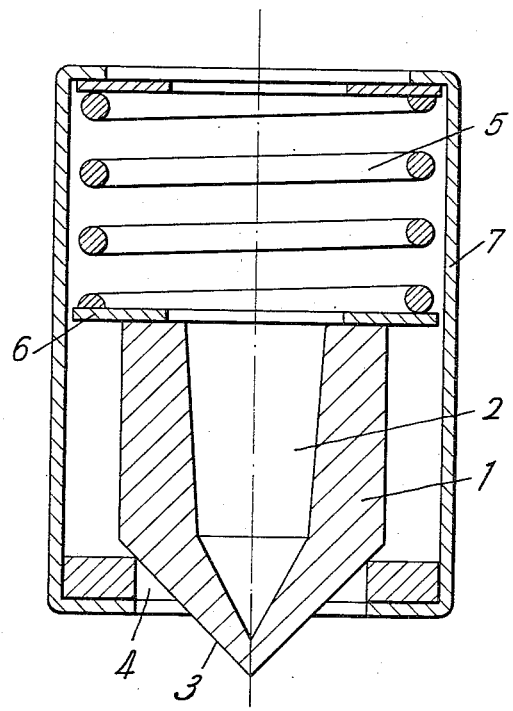
INVENTOR.
JUAN SAPÉ ROCH

United States Patent Office 2,820,680
Patented Jan. 21, 1958

2,820,680

FOOTSTEP BEARING FOR VERTICAL REVOLVING SHAFTS OF HIGH SPEED

Juan Sapé Roch, Badalona, Spain

Application November 16, 1954, Serial No. 469,248

Claims priority, application Spain November 26, 1953

3 Claims. (Cl. 308—156)

The present invention relates to an improved footstep bearing for vertical revolving shafts of high speed.

It has been the aim of many researches to find a practical solution to the problem of the construction of the lower bearing for vertical shafts which are revolving at high speed, such as those of the spindles for spinning frames.

The main difficulty consists in that any solution based on a rigid connection cannot be accepted owing to the fact that it is necessary to obtain a certain flexibility or adaptability to displacements which may occur as a consequence of eccentricities of masses, and whose effects are rapidly increased with the high speed of revolution.

The footstep bearing that constitutes the object of the present invention represents an improved and simple device, particularly adapted to be used as footstep bearing for spinning spindles.

This footstep bearing is essentially characterized by the fact that it comprises a lower conical or nearly conical surface which is partially introduced in a corresponding bore of a circular stationary seat, resting against the edge of the said bore and being pressed downwardly against the seat by the action of a spring.

The generatrix of the conical surface forms an angle of about 45 degrees with the geometrical axis of the shaft for which it constitutes the support.

The accompanying drawing illustrates one embodiment of the invention showing a sectional view on a magnified scale of a footstep bearing for spinning spindles.

The embodiment of the invention shown on the drawing comprises a footstep bearing 1 against whose inner surface 2 rests the shaft of the spindle (not shown). In accordance with the present invention, the lower surface 3 of the footstep bearing 1 is conical, rests against the inner edge of a perforated seat 4 and is pressed against it by the action of a spring 5 through a washer 6. The whole is confined in a sleeve 7 having its upper end flanged inwardly and introduced in the tube or supporting casing of the spindle.

It will be readily understood that the footstep bearing in accordance with the invention is of such fluidity that it allows the spindle shaft to adapt itself to the lateral displacements caused by eventual eccentricities; but at the same time, the guiding point is immediately recovered owing to the spring action. On the other hand, the angular vibrations of the shaft, which would cause lateral displacements of the footstep bearing, are converted immediately to an ascensional movement, and as this movement increases the reaction of the spring, the required centering is at once re-established. Therefore, the revolving shaft is maintained permanently in an exact centered position, but on a flexible mounting. This results in a great regularity of work and in a long duration of the shaft and its guides, with advantages over all conventional footstep bearings for spinning spindles.

It will be obvious that several modifications can be made without departing from the scope and spirit of the invention.

What I claim is:

1. A support assembly for high speed spinning spindles, comprising in combination a sleeve, both ends of said sleeve being bent inwardly to form a top flange and a bottom flange, a centering ring carried on said bottom flange, a footstep bearing ending in a cone seated in line contact on the upper edge of said ring, and a coil spring arranged betwen said top flange and said bearing and forcing said bearing against said edge, said sleeve encasing said bearing and spring and forming therewith a self-contained unit.

2. The assembly defined in claim 1, comprising an annular disc between said top flange and said spring.

3. A support assembly as defined in claim 1 wherein the generatrix of said conical surface forms an angle of about 45 degrees with the symmetry axis of said bearing.

References Cited in the file of this patent

UNITED STATES PATENTS

| | | |
|---|---|---|
| 408,330 | Thrasher | Aug. 6, 1889 |
| 493,034 | Klots | Mar. 7, 1893 |
| 733,611 | Alton | July 14, 1903 |
| 1,923,123 | Stahlecker | Aug. 22, 1933 |
| 2,146,329 | Colomb | Feb. 7, 1939 |